(12) United States Patent
Koodli et al.

(10) Patent No.: US 9,913,173 B2
(45) Date of Patent: Mar. 6, 2018

(54) SMOOTH HANDOVER OF ACTIVE USER TRAFFIC IN MOBILE RADIO BASE STATIONS

(71) Applicant: Google Inc., Mountain View, CA (US)

(72) Inventors: Rajeev Koodli, Saratoga, CA (US); Hassan Sipra, San Jose, CA (US)

(73) Assignee: Google LLC, Mountain View, CA (US)

( * ) Notice: Subject to any disclaimer, the term of this patent is extended or adjusted under 35 U.S.C. 154(b) by 101 days.

(21) Appl. No.: 15/099,132

(22) Filed: Apr. 14, 2016

(65) Prior Publication Data

US 2017/0303168 A1  Oct. 19, 2017

(51) Int. Cl.
| | | |
|---|---|---|
| H04W 4/00 | (2009.01) | |
| H04W 36/00 | (2009.01) | |
| H04W 60/04 | (2009.01) | |
| H04W 36/32 | (2009.01) | |
| H04W 36/18 | (2009.01) | |

(52) U.S. Cl.
CPC ... *H04W 36/0016* (2013.01); *H04W 36/0094* (2013.01); *H04W 36/18* (2013.01); *H04W 36/32* (2013.01); *H04W 60/04* (2013.01)

(58) Field of Classification Search
CPC .... H04W 36/00; H04W 36/385; H04W 84/06
USPC ............................................. 455/435.1, 438
See application file for complete search history.

(56) References Cited

U.S. PATENT DOCUMENTS

| | | | |
|---|---|---|---|
| 8,849,191 B2 | 9/2014 | Gavrilovich | |
| 2004/0203911 A1* | 10/2004 | Masuda | ............... H04B 7/2606 455/456.1 |
| 2015/0237556 A1 | 8/2015 | Giloh | |
| 2015/0245255 A1* | 8/2015 | Van Phan | ......... H04W 36/0016 455/457 |

(Continued)

FOREIGN PATENT DOCUMENTS

| | | |
|---|---|---|
| EP | 2 053 880 | 4/2009 |
| EP | 2410788 A1 | 1/2012 |

(Continued)

OTHER PUBLICATIONS

International Search Report and Written Opinion dated Mar. 13, 2017 in PCT Application No. PCT/US2016/069395.

(Continued)

*Primary Examiner* — Joshua Schwartz
(74) *Attorney, Agent, or Firm* — McDermott Will & Emery LLP

(57) ABSTRACT

This disclosure provides systems, methods, and apparatus for handover of communications between a plurality of radio user equipment and an egressing mobile base station to an ingressing mobile base station. The user equipment are terrestrially located within a geographical service zone (GSZ) having an ingress zone and an egress zone. When an egressing mobile base station enters an egress zone, it initiates a handover to a management node associated with the GSZ. The management node communicates with the ingressing mobile base station, which has entered the ingress zone, to accept the handover of the connections from the (Continued)

egressing base station. The handover is carried out without any disruption of user equipment communications. The management node can also communicate with a flight control node to control one or more flight parameters of the ingressing or egressing base station to facilitate smooth handover.

20 Claims, 7 Drawing Sheets

(56) References Cited

U.S. PATENT DOCUMENTS

2016/0073271 A1* 3/2016 Schultz ................ H04L 63/105
                                                                   455/404.1

FOREIGN PATENT DOCUMENTS

| | | | |
|---|---|---|---|
| EP | 2978258 A1 * | 1/2016 | ........ H04W 36/0055 |
| WO | 2014053183 A1 | 4/2014 | |
| WO | 2015139733 A1 | 9/2015 | |

OTHER PUBLICATIONS

Moon, Jung-Min, et al. Efficient Group Han doff Decision Algorithm for Wireless Networks with Mobile Access Points, The 2011 Military Communications Conference—Track 2—Network Protocols and Performance, pp. 1096-1101, IEEE, 2011.

Third Generation Partnership Project, Technical Specification Group Radio Access Network; Evolved Universal Terrestrial Radio Access (E-UTRA) and Evolved Universal Terrestrial Radio Access Network (E-UTRAN) Overall description; Stage 2 (Relaease 13), 3GPP TS 36.300, V13.3.0, Apr. 1, 2016.

* cited by examiner

SMOOTH HANDOVER OF ACTIVE USER TRAFFIC IN MOBILE RADIO BASE STATIONS

TECHNICAL FIELD

This disclosure relates to the field of communication networks, and in particular communication networks including mobile radio base stations.

DESCRIPTION OF THE RELATED TECHNOLOGY

Wireless communication systems typically include terrestrial, stationary base stations servicing mobile user equipment. In such systems, a base station communicates with mobile user equipment within predefined cells. When the mobile user equipment moves from one cell to another, the connections of the mobile user equipment is handed over from the currently servicing base station to another base station. In some such implementations, a smooth handover of the connections from one mobile base station to another mobile base station is desired.

SUMMARY

According to one aspect, the subject matter described in this disclosure relates to a method for handing over radio communication between a plurality of user equipment (UEs) on the ground, within a geographical service zone having an associated ingress zone and an egress zone, and an egressing mobile base station to an ingressing mobile base station. The method includes receiving, at a management node on the ground, a registration request from an ingressing mobile base station when the ingressing mobile base station enters the ingress zone. The method further includes sending, from the management node, communication parameters associated with the geographical service zone to the ingressing mobile base station. The method also includes receiving, at the management node, a handover request from an egressing mobile base station when the egressing mobile base station enters the egress zone, where the handover request includes a list of UEs selected from the plurality of UEs. The method additionally includes sending, from the management node, a forwarding handover request to the ingressing mobile base station. The method further includes receiving, at the management node, a handover reply message from the ingressing mobile base station, the handover reply message including information associated with each of the UEs in the list of UEs with which the ingressing mobile base station is capable of establishing communication. The method also includes sending, from the management node, the handover reply message to the egressing mobile base station.

According to another aspect, the subject matter described in this disclosure relates to a mobile communication system for serving a plurality of user equipment (UEs) on the ground within a geographical service zone having an associated ingress zone and an associated egress zone. The system includes a management node configured to receive a registration request from an ingressing mobile base station when the ingressing mobile base station enters the ingress zone. The management is further configured to send communication parameters associated with the geographical service zone to the ingressing mobile base station. The management node is also configured to receive a handover request from an egressing mobile base station when the egressing mobile base station enters the egress zone, where the handover request includes a list of UEs selected from the plurality of UEs. The management node is additionally configured to send the handover request to the ingressing mobile base station. The management node is also configured to receive a handover reply message from the ingressing mobile base station, the handover reply message including information associated with each of UEs in the list of UEs with which the ingressing mobile base station is capable of establishing communication, and to send the handover reply message to the egressing mobile base station.

According to another aspect, the subject matter described in this disclosure relates to a non-transitory computer readable storage medium having instructions encoded thereon, which when executed by a processor cause the processor to perform a method for handing over radio communication between a plurality of user equipment (UEs) on the ground, within a geographical service zone having an associated ingress zone and an egress zone, and an egressing mobile base station to an ingressing mobile base station. The method includes receiving, at a management node on the ground, a registration request from an ingressing mobile base station when the ingressing mobile base station enters the ingress zone. The method further includes sending, from the management node, communication parameters associated with the geographical service zone to the ingressing mobile base station. The method also includes receiving, at the management node, a handover request from an egressing mobile base station when the egressing mobile base station enters the egress zone, where the handover request includes a list of UEs selected from the plurality of UEs. The method additionally includes sending, from the management node, a forwarding handover request to the ingressing mobile base station. The method further includes receiving, at the management node, a handover reply message from the ingressing mobile base station, the handover reply message including information associated with each of the UEs in the list of UEs with which the ingressing mobile base station is capable of establishing communication. The method also includes sending, from the management node, the handover reply message to the egressing mobile base station.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1A:
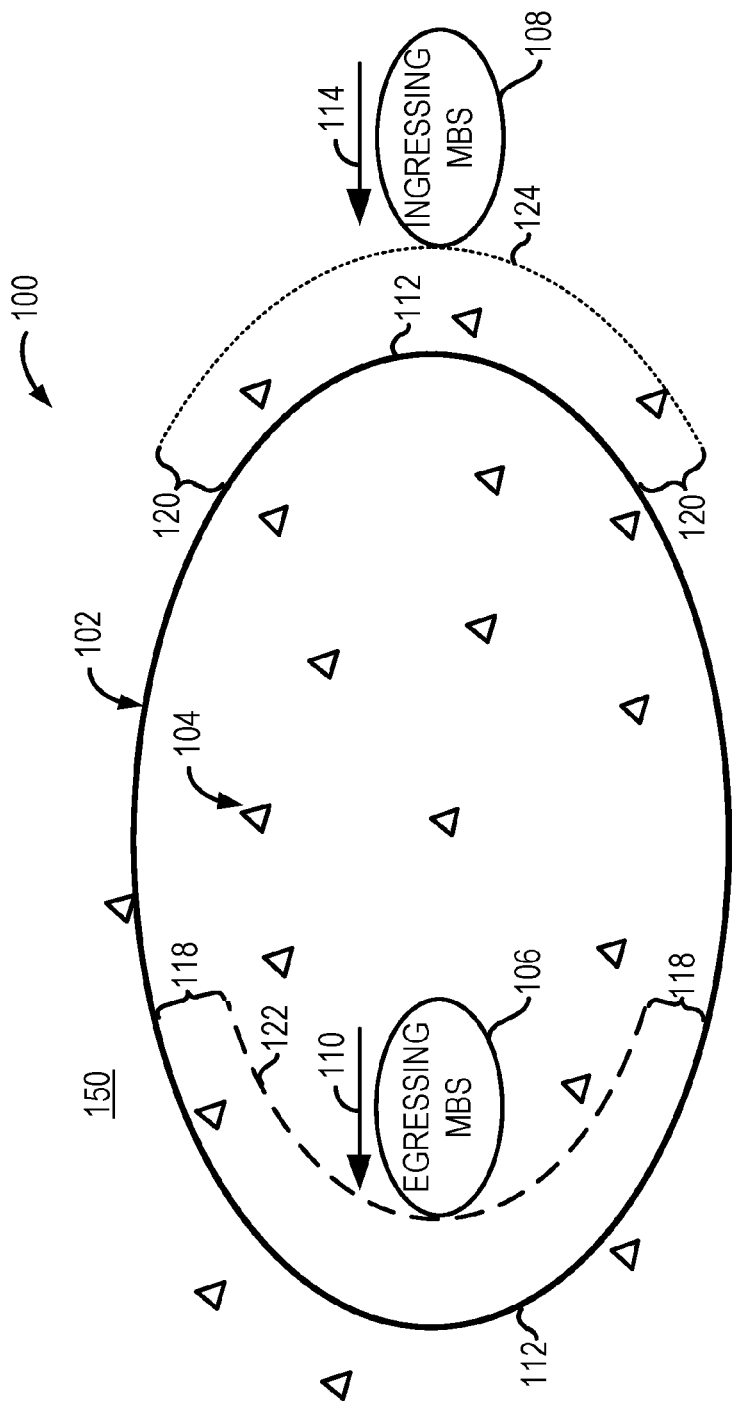
FIG. 1A shows a plan view of an example communication system.
Figure 1B:
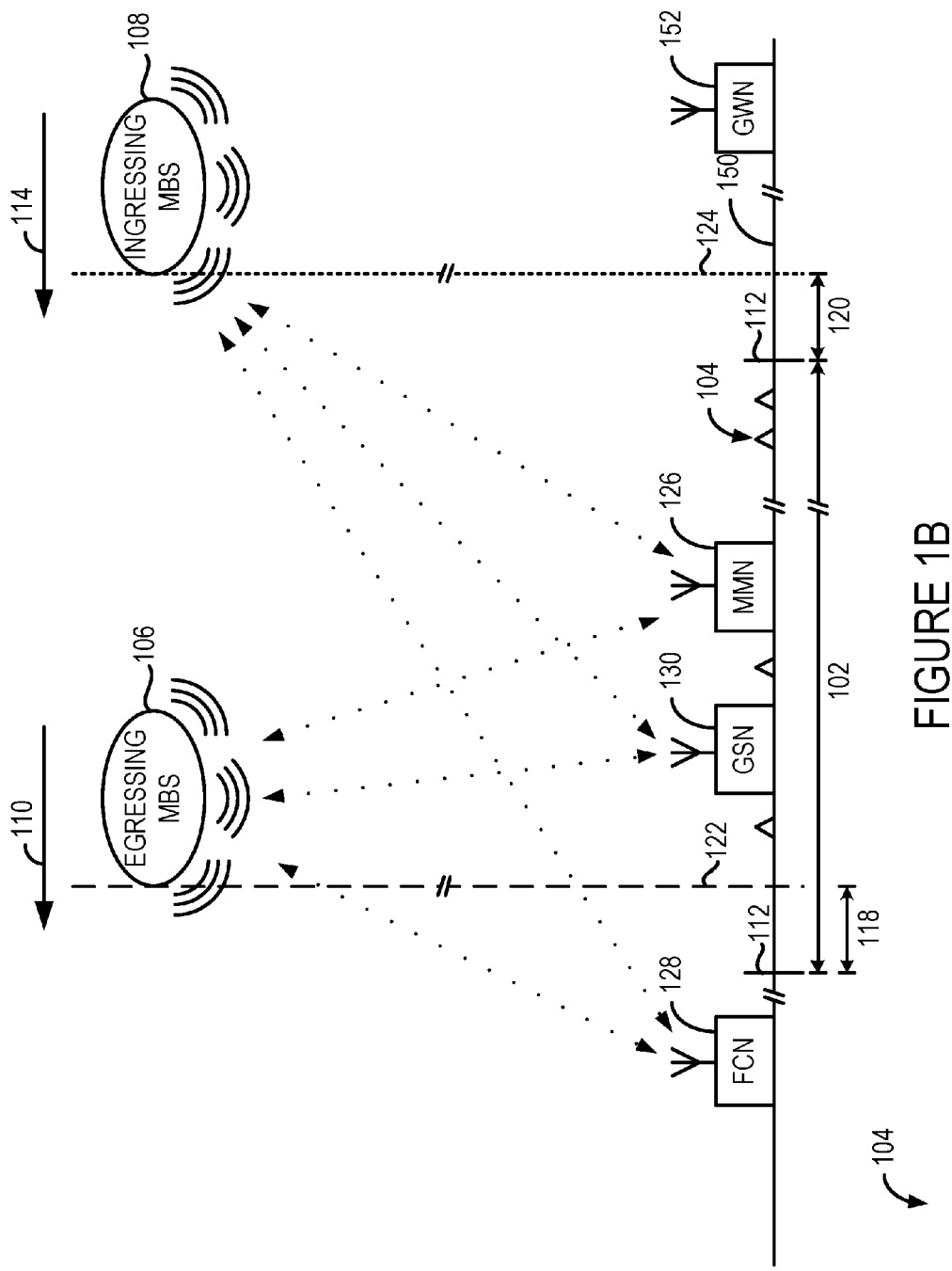
FIG. 1B shows a side view of the example communication system shown in FIG. 1A.

FIGS. 1A and 1B show a plan view and a side view, respectively, of an example communication system 100 including mobile radio base stations. In particular, FIG. 1A shows a geographical service zone (GSZ) 102 defined over a terrestrial area on the earth's surface 150. The GSZ can include several user equipment (UEs) 104, which can include radio equipment, cellular phones, laptops, tablets, etc., and can be mobile or stationary. The UEs 104 within the GSZ 102 can be serviced by one or more high-altitude mobile base stations (MBS). The MBS can provide radio communications to the UEs 104 based on various radio communication technologies such as Global System for Mobile Communications ("GSM"), Enhanced Data rates for GSM Evolution ("EDGE"), Universal Mobile Telecommunication System ("UMTS"), Code Division Multiple Access ("CDMA"), Time Division Synchronous Code Division Multiple Access ("TD-SCDMA"), High Speed Packet Access ("HSPA"), Long-Term Evolution ("LTE"), LTE Advanced, Long-Term Evolution Time-Division Duplex ("LTE-TDD"), or any other such protocol including, but not limited to, so-called "3G," "4G," and "5G" protocols.

FIG. 1A shows an egressing MBS 106 and an ingressing MBS 108. The egressing MBS 106, having a direction of motion shown by arrow 110, is shown in a position that is close to the perimeter 112 at one end of the GSZ 102. The egressing MBS 106 is the mobile base station that is currently servicing the UEs 104 within the GSZ 102. In addition, the ingressing MBS 108, having a direction of motion shown by arrow 114, is shown in a position that is close to the perimeter 112 at another end of the GSZ 102. The ingressing MBS 108 may take over servicing the UEs 104 if the egressing MBS 106 begins to move out of the GSZ 102. While FIG. 1A shows only one GSZ 102, in some implementations, other GSZs may be defined adjacent to the GSZ 102. Thus, while the egressing MBS 106 is egressing the GSZ 102, it may be ingressing another adjacent GSZ. Similarly, while the ingressing MBS 108 may be egressing a GSZ adjacent to or near the perimeter 112 of the GSZ 102 while also ingressing the GSZ 102.

In some implementations, the boundaries of the GSZ 102 can be defined by utilizing geo-fencing using the global positioning system (GPS). For example, the boundaries of the GSZ 102 can be defined using geo-coordinates (for example, longitude and latitude), which can be stored at a mobility management node (discussed further below). The stored geo-coordinates of the boundaries can be compared to the geo-locations of the mobile base stations to determine the locations of the mobile base stations in relation to the boundaries of the GSZ 102. In some implementations, the perimeter 112 of the GSZ 102 can be defined based on the boundaries of the GSZ 102. For example, the perimeter 112 can be coincident with the boundary of the GSZ 102.

In some implementations, egress and ingress zones can be defined with respect to the boundaries of the GSZ 102 to further aid in determining the locations of the mobile base stations with respect to the boundaries of the GSZ 102. For example, an egress zone 118 and an ingress zone 120 can be defined with respect to the perimeter 112 of the GSZ 102. The egress zone 118 is defined between an egress zone boundary 122 and the perimeter 112, while the ingress zone 120 is defined between the ingress zone boundary 124 and perimeter 112. In some implementations, as shown in FIG. 1A, the egress zone can be defined within the GSZ 102, while the ingress zone can defined outside of the GSZ 102. However, in some other implementations, the egress zone or the ingress zone can be defined either within or outside the GSZ 102. In some implementations, the egress zone 118 and the ingress zone 120 can be defined based on the direction of motion of the mobile base stations. For example, the egress zone boundary 122 and the ingress zone boundary 124 can be offset from the perimeter 112 in a direction that is opposite to the direction of motion of the mobile base stations. In some implementations, the egress zone boundary 122 can have a shape that is substantially similar to the shape of the perimeter 112 of the GSZ 102 near the egress zone boundary 122. Similarly, the ingress zone boundary 124 also can have a shape that is substantially similar to the shape of the perimeter 112 near the ingress zone boundary 124. In some implementations, the egress zone boundary 122 can extend throughout the inside of the perimeter 112. In some such implementations, the egress zone 118 can be defined by the area between the egress zone boundary 122 and the perimeter 112. The ingress zone boundary 124 also can extend to completely surround the perimeter 112. In some such implementations, the ingress zone 120 can be defined by the area between the perimeter 112 and the surrounding ingress zone boundary 124. The location of the mobile base stations with respect to the egress zone 118 and/or the ingress zone 120 can aid in determining the timing of operations for handover of connections from an egressing mobile base station to an ingressing mobile base station.

In some implementations, a mobile base station can be considered to be in one of three positions with respect to the GSZ 102: an egressing position, an ingressing position, and an in-zone position. For example, the egressing MBS 106 can be considered to be in an egressing position when it crosses the egress zone boundary 122 to enter the egressing zone 118, and the ingressing MBS 108 can be considered to be in an ingressing zone when it crosses the ingress zone boundary 124 to enter the ingress zone 120. A mobile base station in any other position within the GSZ 102 outside of the ingress zone 120 and the egress zone 118 can be considered to be in an in-zone position.

The shape of the GSZ 102 is not limited to the elliptical shape shown in FIG. 1A. In some implementations, the GSZ 102 can have an arbitrary shape, a rectangular shape, a circular shape, a square shape, etc. In some implementations, the GSZ 102 can have a shape similar to the shape of a region, municipality, county, or country within which UEs 104 to be serviced are located. In some implementations, the ingress zone boundary 124 and the egress zone boundary 122 can have a pattern that is congruent with their nearest respective boundary of the GSZ 102. In some implementations, the size of the GSZ 102 can be between about a few sq. km. to about 50 sq. km. In some implementations, the GSZ 102 can extend up to about 80 km or up to about 100 km along its longest axis.

FIG. 1B shows a side view of the communication system 100 shown in FIG. 1A. Similar to communication system shown in FIG. 1A, FIG. 1B also shows a number of UEs 104, the egressing MBS 106, the ingressing MBS 108, the location of the perimeter 112 of the GSZ 102 on the surface 150, the egress zone boundary 122 of the egress zone 118, and the ingress zone boundary 124 of the ingress zone 120. The communication system 100 also includes a mobility management node (MMN) 126, a flight control node (FCN) 128, a gateway node (GWN) 152, and a ground station node (GSN) 130. The MMN 126 manages communications between the UEs 104 and the mobile base stations, such as the egressing MBS 106 and the ingressing MBS 108. As discussed further below, the MMN 126 manages the smooth handover of wireless service provided by the egressing MBS 106 to the ingressing MBS 108. In some implementations, the MMN 126 can manage the service provided to the UEs 104 that are within the GSZ 102. The MMN 126 also can limit the service provided to the UEs 104 within the GSZ 102 to a single mobile base station, as long as the mobile base station has not yet entered the egress zone 118. In some implementations, the MMN 126 can be located within the GSZ 102 such that it can communicate with any mobile base station that is within the GSZ 102 and also within the ingress zone 120 associated with the GSZ 102. In some implementations, the MMN 126 can be located terrestrially on the surface 150. In some other implementations, the MMN 126 can be located above the surface 150 in balloons, towers, drones, a satellite, etc., that can be maintained within the GSZ 102. Additional functions of the MMN 126 are discussed further below with reference to FIGS. 2-4.

The egressing MBS 106 and the ingressing MBS 108 are high-altitude mobile base stations carried on high-altitude platforms, which can include, without limitations, aerostats such as a zeppelin, dirigible, or a hot-air balloon; fixed-wing airplane; and rotorcrafts such as multi-copter drones. In some implementations, the egressing MBS 106 and the ingressing MBS 108 can be maintained at a height of hundreds of meters to thousands of meters from the surface 150. For example, the egressing MBS 106 and the ingressing MBS 108 can be maintained at a height of over about 10,000 m. In some implementations, the egressing MBS 106 and the ingressing MBS 108 can be based on platforms, the flight parameters of which can be controlled by the FCN 128. In some implementations, several mobile base stations can be deployed over the surface 150 for servicing UEs in various GSZs. The mobile base stations can be configured to move in and out of these GSZs, and, if needed, provide service to UEs within those GSZs. The egressing MBS 106 can include transceivers that can communicate with the UEs 104 within the GSZ 102 to carry voice and data signals, and communicate the traffic generated by the UEs 104 to the GSN 130. The ingressing MBS 108 performs similar functions when it takes over from the egressing MBS 106. The egressing MBS 106 and the ingressing MBS 108 also can communicate with the MMN 126, which manages the communication between the mobile base stations and the UEs 104. The mobile base stations can include global positioning system (GPS) receivers and can be capable of communicating with global navigation satellites to determine their geo-location. Examples of global navigation satellite systems include the United States' Global Positioning System ("GPS") satellites, Russia's GLObal NAvigation Satellite System ("GLONASS") satellites, Europe's Galileo satellites, and China's BeiDou Navigation Satellite System ("BDS").

Figure 1C:
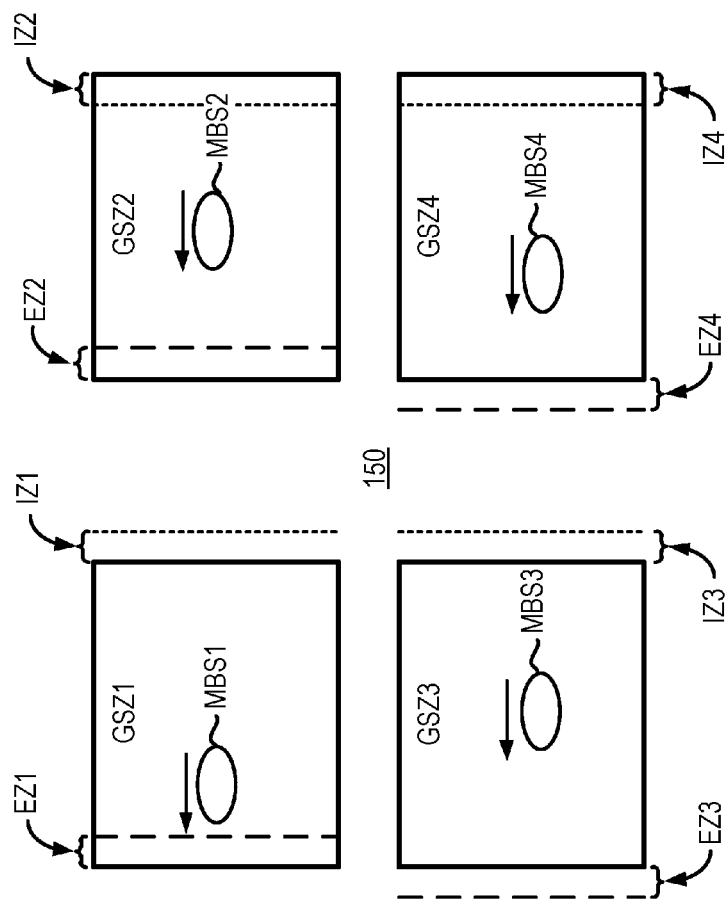
FIG. 1C shows a plan view of multiple global service zones defined on a surface.

FIG. 1C shows a plan view of multiple global service zones defined on a surface 150. In particular, FIG. 1C shows four GSZs: GSZ1-GSZ4 with various example ingress and egress zone positions. In some implementations, one or more GSZs shown in FIG. 1C may overlap with each other or have one or more common boundaries. Each GSZ can include several UEs (not shown). FIG. 1C also shows a number of mobile base stations MBS1-MBS4 moving in a direction shown by their respective associated arrows, and positioned within GSZ1-GSZ4, respectively. Each GSZ includes an ingress zone and an egress zone. For example, the GSZ1 includes an egress zone EZ1 that is located within the GSZ1 and an ingress zone IZ1 that is located substantially outside the GSZ1. GSZ2 includes an egress zone EZ2 that is located substantially within the GSZ and an ingress zone IZ2 that is also located substantially within the GSZ2. GSZ3 includes an egress zone EZ3 that is located substantially outside of the GSZ3, and an ingress zone IZ3 that is also located outside of the GSZ3. Finally, GSZ4 includes an egress zone EZ4 that is located outside of the GSZ4 and an ingress zone IZ4 that is located inside of the GSZ4. When a mobile base station crosses a first edge of any of the egress zones EZ1, EZ2, EZ3, or EZ4 in the direction of motion of the mobile base station, the mobile base station can trigger a handover operation by sending a handover request to the appropriate MMN. Similarly, when a mobile base station crosses a first edge of any of the ingress zones IZ1, IZ2, IZ3, and IZ4 in the direction of motion of the mobile base station, the mobile base station can send a registration request to the appropriate MMN. The ingress and egress zones can be defined inside or outside of the GSZs based on several factors, such as the coverage area of the mobile base stations, range of the MMNs within the GSZ, etc. The GSZs GSZ1-GSZ4 shown in FIG. 1C differ from the GSZ 102 shown in FIG. 1A in that while the GSZ 102 has an elliptical shape, the GSZ1-GSZ4 have a substantially rectangular shape. However, the various locations of the ingress and egress zones shown with respect to GSZ1-GSZ4 can be readily applied to the ingress and egress zones 120 and 118, respectively, of the GSZ 102 or to ingress and egress zones of GSZ of any shape and size.

Referring again to FIG. 1B, The FCN 128 can monitor and control the physical movement of the mobile base stations including the egressing MBS 106 and the ingressing MBS 108, and can verify the locations of the mobile base stations for the MMN 126. In some implementations, the FCN 128 can be located terrestrially on the surface 150. In some implementations, the FCN 128 can be located at a data center. In some other implementations, the FCN 128 can be located above the surface 150, such as, on a tower, in a balloon, on a drone, etc. In some implementations, the FCN 128 can communicate with the mobile base stations over a control plane or a backbone network that is independent of the network over which the mobile base stations communicate with the UEs 104. In some implementations, the FCN 128 can control one or more flight parameters of the mobile base stations, such as the ingressing MBS 108 and the egressing MBS 106. For example, the FCN 128 can control the speed, direction, and altitude of the mobile base stations. In some implementations, the FCN 128 can receive requests from the MMN 126 to change one or more flight parameters of the mobile base stations. The FCN 128 can also verify the location of a mobile base station for the MMN 126. For example, when the ingressing MBS 108 sends a registration request to the MMN 126 (discussed below), the MMN 126 can communicate with the FCN 128 to verify the location of the ingressing MBS 108. In some implementations, the FCN 180 can communicate with, and receive requests from, MMNs of more than one GSZs to modify the flight, or to verify the location, of mobile base stations entering the respective GSZs.

Each mobile base station registers with the MMN 126 before it can begin to service UEs 104 within the GSZ 102. For example, when the ingressing MBS 108 enters the ingress zone 120, the ingressing MBS 108 can send a registration request message to the MMN 126. The ingressing MBS 108 can obtain communication information associated with the MMN 126, such as an IP address of the MMN 126. In some implementations, the ingressing MBS 108 also can obtain communication information associated with the GSZ 102 from the MMN 126. For example, the information can include the GSZ 102 band information, LTE Tracking Area Codes, Public Land Mobile Network (PLMN) ID, Cell ID, neighboring Cell ID, etc. used within the GSZ 102. The MMN 126, in response to receiving the registration request from the ingressing MBS 108, sends a verification message to the FCN 128. The verification message can include the identity of the ingressing MBS 108. The FCN 128, in response to the verification message, verifies that the ingressing MBS 108 is in fact entering the ingress zone 120. As the FCN 128 keeps a record of the instantaneous positions of the ingressing MBS 108 and the geolocations of the ingress zone 120 the FCN 128 can verify whether the ingressing MBS 108 has entered the ingress zone 120 and provide the verification to the MMN 126. If the FCN 128 positively verifies that the ingressing MBS 108 is within the ingress zone 120, the MMN 126 can register the ingressing MBS 108, otherwise the MMN 126 can deny registration to the ingressing MBS 108. The MMN 126 communicates the acceptance or denial of registration with a registration response message to the ingressing MBS 108. The registration response message can include communication parameters such as the IP address of the MMN 126.

The registration response message can include several parameters that allow the ingressing MBS 108 to establish communication with the UEs 104 within the GSZ 102. For example, if the GSZ 102 utilizes an LTE based communication infrastructure, the registration response message can include the GSZ 102 band information, LTE Tracking PLMN ID, Cell ID, neighboring Cell ID, etc., of the GSZ 102 if not already received by the ingressing MBS 108. Each mobile base station, such as the ingressing MBS 108 and the egressing MBS 106, maintains a Physical Cell ID (PCI) that is unique to the mobile base station. In some implementations, each mobile base station can maintain a PCI that is at least different from the PCIs of the immediate neighboring mobile base stations. Once the ingressing MBS 108 receives the communication parameters from the MMN 126 it is now configured to establish communications with the UEs 104 within the GSZ 102. However, in some implementations, the ingressing MBS 108 refrains from enabling its radio transceivers until handover.

The GSN 130 carries traffic generated by and directed to the UEs 104. In particular, the base station that is currently servicing the UEs 104 communicates with the GSN 130 to carry the UE 104 traffic. The GSN 130 can include transceivers and switches for receiving UE 104 traffic from the currently servicing mobile base station and direct the received traffic to a communication network, and for receiving traffic from the communication network and sending the traffic to the currently servicing mobile base station. In some other implementations, the GSN 130 can be located in or near the GSZ 102 so that the GSN 130 can be within communication range of the egressing MBS 106 and the ingressing MBS 108 or any in-zone MBS within the GSZ 102. The GSN 130 also can direct UE 104 traffic to the GWN 152, which serves as a gateway to additional communication networks, which can include networks such as wide area networks (WANs), local area networks (LANs), the Internet, proprietary networks, etc. In some implementations, the GWN 152 can be connected to a data center via the additional communication networks. The GWN 152 may include protocol translators for allowing data transfer between different communication networks. In some implementations, the GWN 152 can include networking devices such as network switches, routers, proxy servers, firewalls, etc. to appropriately communicate UE 104 traffic to and from the GSN 130. In some implementations, the GWN 152 can communicate with the MMN 126 to receive commands for switching traffic paths from the egressing MBS 106 to the ingressing MBS 108 as part of the handover operations. In some implementations, the GWN 152 can be located at a data center.

In some implementations, only one mobile base station may provide service to the UEs within a single GSZ. For example, only the egressing MBS 106, which is within the GSZ 102, may provide service to the UEs 104. The ingressing MBS 108, which is outside of the GSZ 102 may not provide service to the UEs 104 as long as the egressing MBS 106 is doing so. However, as discussed further below, the egressing MBS 106 can handover the connections established with the UEs 104 to the ingressing MBS 108 before exiting the GSZ 102. The handover can be carried without disrupting the UE 104 connections.

Figure 2:
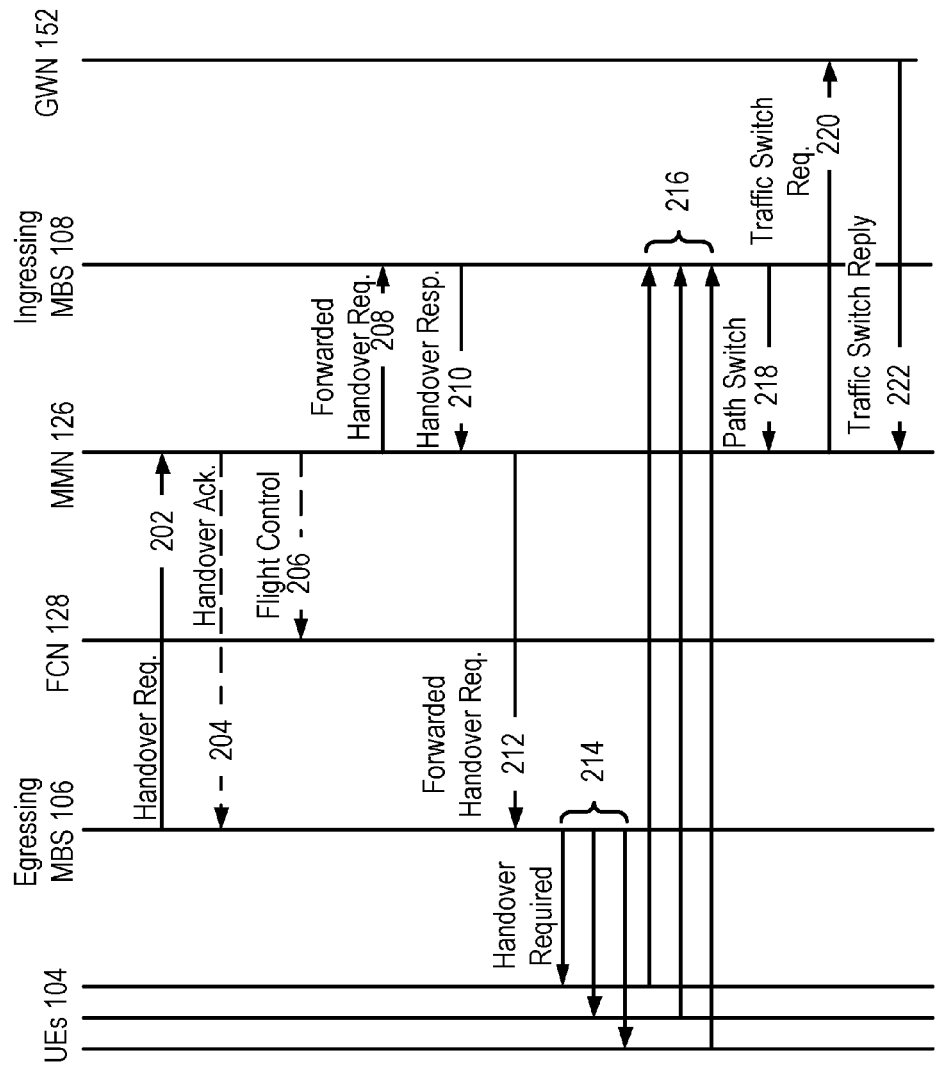
FIG. 2 shows a flow diagram of an example handover operation.

FIG. 2 shows a flow diagram of an example handover operation 200. In particular, the flow diagram 200 shows the process for handing over communications to the UEs 104 from the egressing MBS 106 to the ingressing MBS 108. The handover process begins with the egressing MBS 106 sending a handover request 202 to the MMN 126. In some implementations, the egressing MBS 106 can monitor its location in relation to the egress zone 118 (shown in FIGS. 1A and 1B). If the location of the egressing MBS 106 crosses the egress zone boundary 122, which is the first boundary of the egress zone 118 crossed due to the right to left direction of motion, a handover operation can be triggered. Triggering of the handover operation can cause the egressing MBS 106 to send the handover request 202 to the MMN 126. In some implementations, the FCN 128 can instead monitor the location of the egressing MBS 106 in relation to the egress zone 118, and send a message to the egressing MBS 106 if its location crosses the egress zone boundary 122. The egressing MBS 106 can then send the handover request 202 to the MMN 126. Unlike terrestrial mobile communication systems, in which the user equipment typically triggers the handover from one base station to another, in the communication system 100, the handover request is instead initiated by the mobile base stations.

The handover request 202 can include a list of UEs 104, and associated information, that is handed over the ingressing MBS 108 to achieve smooth handover of the UE 104 connections to the ingressing MBS 108. In some implementations, the associated information can include UE identifiers, allocated radio resources, allocated logical channels (such as default and dedicated bearers used in LTE) and other UE parameters. In some implementations, the list of UEs 104 can include all of the UEs that the egressing MBS 106 is currently servicing. In some other implementations, the list of UEs can include a subset of all of the UEs currently serviced by the egressing MBS 106. In some implementations, the list of UEs 104 sent to the MMN 126 can be an ordered list. That is, the handover of the UEs 104 is requested in the order indicated by the ordered list. In some implementations, the ordered list can be generated based on the received power strength of the UEs 104 at the egressing MBS 106. For example, the egressing MBS 106 can arrange the UEs 104, in the handover request 202, in the order of increasing signal strength, such that the UE 104 with the least signal strength is listed first. In some other implementations, the ordered list can include only those UEs 104 that have a signal strength below a threshold. As the egressing MBS 106 moves further away from UEs, a new list of UEs that have the signal strength below the threshold can be generated and sent with another handover request. In this manner, the egressing MBS 106 can send several handover requests, each with an ordered list including a subset of UEs 104, to the MMN 126. In some implementations, the ordered list can be generated based on the geographical proximity of the UEs 104 to the egressing MBS 106. The egressing MBS 106 can set a threshold distance, and include only those UEs 104 in the list that are located at a distance that is greater than the threshold distance. In some other implementations, the ordered list can be based on the proximity of the UEs 104 to the ingress zone 120. In some such implementations, the ordered list can include only a subset of UEs 104 that are located within a threshold distance from the ingress zone 120.

In some implementations, the MMN 126 can optionally acknowledge each handover request 202 received from the egressing MBS 106 with a handover acknowledge message 204. The Handover Acknowledge message 204 indicates to the egressing MBS 106 that the list of UEs 104 requested for handover has been received and being processed. In some implementations, if the egressing MBS 106 does not receive an acknowledge message from the MMN 126 after a predetermined time period, the egressing MBS 106 may resend the un-acknowledged handover request. In some implementations, the egressing MBS 106 refrains from resending the un-acknowledged handover requests if it has moved out of the GSZ 102.

In some implementations, the handover request 202 may not include the identity of the ingressing MBS 108. Instead, the MMN 126 can determine whether any ingressing mobile base station has already registered with the MMN 126. If more than one ingressing mobile base station has registered with the MMN 126, the MMN 126 may select one based on various factors. For example, the MMN 126 may select the mobile base station that is nearest to the egress zone 118. In some implementations, the MMN 126 may select the slowest registered mobile base station for handover. Selecting the slowest mobile base station can increase the time for which the selected registered mobile base station can provide service to the UEs 104 and therefore reduce the rate of handover requests.

In some implementations, there may be no ingressing mobile base stations registered with the MMN 126 when it receives the handover request 202 from the egressing MBS 106. This can occur, for example, if there is no other mobile base station within range of the ingress zone 120 of the GSZ 102. In some such implementations, the MMN 126 can include a "pause" message in the handover acknowledge message 204 to the egressing MBS 106, indicating that handover could not be immediately initiated. In some implementations, the MMN 126 can send a flight control request 206 to the FCN 128 to cause the FCN 128 to control flight parameters of the egressing MBS 106 or an ingressing MBS 108, or both, to allow an ingressing MBS 108 to register with the MMN 126 before the egressing MBS 106 leaves the GSZ 102. For example, the flight control request 206 can include instructions to reduce the speed of the egressing MBS 106 and to increase the speed of the ingressing MBS 108, to allow the ingressing MBS 108 come in rage of the ingress zone 120 and register with the MMN 126 before the egressing MBS 106 leaves the GSZ 102. For example, in some implementations, the FCN 128 can cause the mobile base stations to change their altitudes to bring about changes in their speed taking advantage of different wind speeds at different altitudes. The FCN 128 can store the relevant wind speed information for various altitudes and select the appropriate altitude to achieve the desired mobile base station speed. After the ingressing MBS 108 has entered the ingress zone 120, the MMN 126 can register the ingressing MBS 108. In some implementations, after registration, the MMN 126 may instruct the FCN 128 to reduce the speed of the ingressing MBS 108 to its normal speed.

After selecting the registered ingressing MBS 108, the MMN 126 forwards each handover request received from the egressing MBS 106 in a forwarded handover request 208 to the ingressing MBS 108. The ingressing MBS 108 accesses the list of UEs 104 included in the forwarded handover request 208. For each UE 104 listed (and in the order listed) the ingressing MBS 108 allocates the required radio resources. Once the radio resources have been allocated to each of the listed UEs, the ingressing MBS 108 sends a handover reply message 210 to the MMN 126. The handover reply message 210 can include a list of UEs 104 along with synchronization and attachment details that can allow the UEs 104 to establish communication with the ingressing MBS 108. In some implementations, the synchronization and attachment details can include radio random access channel information (RACH), system information blocks (SIB), and the PCI of the ingressing MBS 108. In some implementations, the handover reply message 210 may include only a subset of the list of UEs received in the forwarded handover request message 208.

The MMN 126 forwards the handover reply message 210 received from the ingressing MBS 108 to the egressing MBS 106 in a forwarded handover reply message 212. The egressing MBS 106 then sends handover required messages 214 to each of the UEs 104 listed in the forwarded handover reply message 212. The handover required message 214 can include the synchronization and attachment details to be utilized by the UEs 104 to establish a connection with the ingressing MBS 108. The UEs 104, in turn, use the synchronization and attachment details to establish a connection 216 with the ingressing MBS 108. In some implementations, the UEs 104 can perform radio synchronization and attach operations with the ingressing MBS 108 based on the 3GPP standards specifications.

After the UEs 104 establish a connection 216 with the ingressing MBS 108, the ingressing MBS 108 sends a path switch message 218 to the MMN 126. In response, the MMN 126 sends a traffic switch request message 220 to the GWN 152 to initiate forwarding traffic meant for the UEs 104 via the ingressing MBS 108 instead of the egressing MBS 106. Once the traffic switch has been initiated by the GWN 152, the GWN 152 sends a traffic switch response 222 to the MMN 126 to indicate that the traffic switch has been successfully initiated. After the traffic switch is completed, the UEs 104 are serviced by the ingressing MBS 108. The above discussed handover process is again repeated with the ingressing MBS 108 begins to egress the GSZ 102. Thus, the connections to the UEs 104 is handed over from an egressing MBS 106 to an ingressing MBS 108 without any disruption to UE 104 communications.

Figure 3:
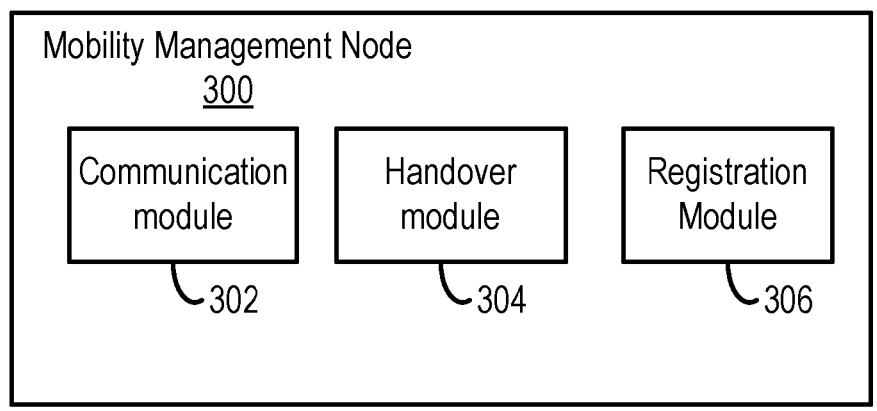
FIG. 3 shows a block diagram of an example mobility management node.

FIG. 3 shows a block diagram of an example mobility management node (MMN) 300. In particular, the MMN 300 shown in FIG. 3 can be utilized to implement the MMN 126 shown in FIGS. 1A and 1B. The MMN 300 can include a communication module 302, a handover module 304, and a registration module 306. The communication module 302 can include transceivers, antennas, and network interface units for communicating with the mobile base stations (such as the egressing and ingressing MBSs 106 and 108 shown in FIGS. 1A and 1B), a flight control node (such as FCN 128 shown in FIG. 1B), and a gateway network node (such as GWN 152 shown in FIG. 1B). The handover module 304 can perform handover operations for handing over user equipment connections from an egressing mobile base station to an ingressing mobile base station. The registration module 306 can perform registration operations for registering mobile base stations that enter an ingress zone of a geographical service zone associated with the MMN 300. In some implementations, the MMN 300 also can include a global positioning system (GPS) module that can define the geo-coordinates of the GSZ and the ingress and egress zones. The GPS module can be capable of communicating with global communication satellites to obtain geo-location information. In some implementations, one or more of the modules in the MMN 300 can be implemented in software, hardware, or a combination of software and hardware.

Figure 4:
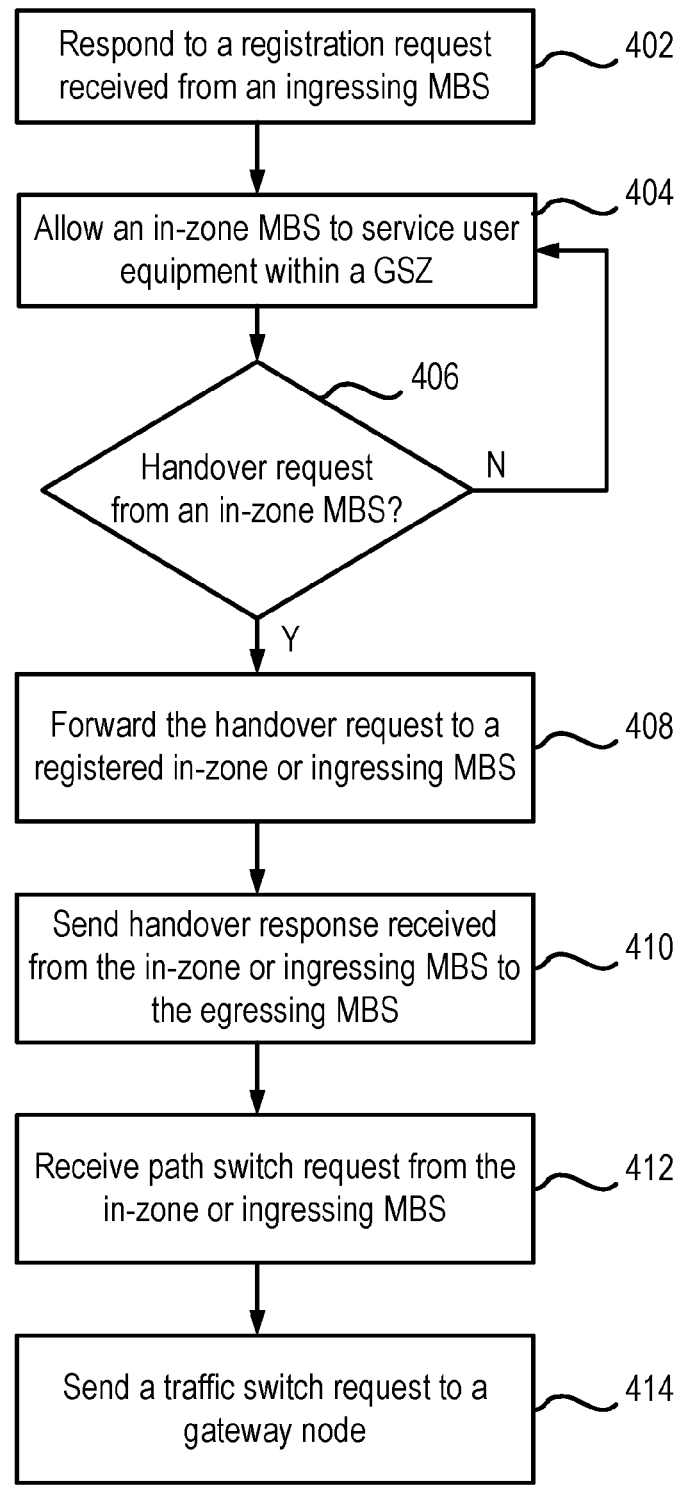
FIG. 4 shows a flowchart of an example process executed by the mobility management node shown in FIG. 3.

FIG. 4 shows a flowchart of an example process 400 executed by the mobility management node 300 shown in FIG. 3. In particular, the process 400 includes responding to a registration request received from an ingressing mobile base station (MBS) (stage 402), managing an in-zone mobile base station to service user equipment within an associated geographical service zone (stage 404), determining the receipt of a handover request from an egressing MBS (stage 406), forwarding the handover request to a registered in-zone or ingressing MBS (stage 408), sending handover response received from the in-zone or ingressing MBS to the egressing MBS (stage 410), receiving path switch request from the in-zone or ingressing MBS (stage 412), and sending traffic switch request to a gateway node (stage 414).

As mentioned above, the process 400 includes responding to a registration request received from an ingressing mobile base station (MBS) (stage 402). One example of this process stage has been discussed above in relation to FIGS. 1A-1B. For example, the MMN 126 responds to a registration request received from the ingressing MBS 108 when the ingressing MBS 108 enters the ingress zone 120. The communication module 302 shown in FIG. 3 can receive the registration request from the ingressing MBS 108 and provide the registration request to the registration module 306. The registration module 306 can send a verification request to a flight control node (such as the FCN 128 shown in FIG. 1B), via the communication module 302, to verify the position of the ingressing MBS 108. Upon receiving positive verification from the flight control node, the registration module can send a registration response message to the ingressing MBS. The registration response message can include a confirmation of registration and can also include communication parameters such as the IP address of the MMN 300.

The process 400 also includes managing an in-zone MBS to service user equipment within the associated GSZ (stage 404), and determining the receipt of a handover request from an egressing MBS (stage 406). As discussed above in relation to FIGS. 1A-2, the MMN 126 can allow the egressing MBS 106 prior to it entering the egress zone 118 to provide service to the UEs 104 within the GSZ 102. When the egressing MBS 106 enters the egress zone 118, it sends a handover request to the MMN 126. Referring to the MMN 300 shown in FIG. 3, the handover module 304 can receive the handover request received from the egressing MBS, it initiates the handover operations.

The process 400 further includes forwarding a handover request to a registered in-zone or ingressing MBS (stage 408). One example of this process stage has been discussed above in relation to FIG. 2. For example, as shown in FIG. 2, the MMN 126 sends a forwarded handover request message 208 to the ingressing MBS 108. Referring to FIG. 3, the handover module 304 can generate the forwarded handover request message and have the communication module 302 send the message to the ingressing MBS.

The process 400 also includes sending handover response received from the in-zone or ingressing MBS to the egressing MBS (stage 410). One example of this process stage has been discussed above in relation to FIG. 2. For example the MMN 126 receives a handover reply message 210 from the ingressing MBS 108. The MMN 126 then sends the received handover reply message in a forwarded handover reply message 212 to the egressing MBS 106. Referring to FIG. 3, the handover module can receive a handover response message from the ingressing MBS in response to sending the forwarded handover request message. In response, the handover module can forward the received handover response to the egressing MBS using the communication module 302.

The process further includes receiving path-switch request from the in-zone or ingressing MBS (stage 412). One example of this process stage has been discussed above in relation to FIG. 2. For example, the MMN 126 receives a path switch request message 218 from the ingressing MBS 108 after the ingressing MBS 108 has established communications with the handed over UEs 104. The receipt of the path switch request message 218 indicates a request to change the path of data associated with the handed over UEs 104 at the GWN 152 from the egressing MBS 106 to the ingressing MBS 108.

The process also includes sending the traffic switch request to a gateway node (stage 414). One example of this process stage has been discussed above in relation to FIG. 2. For example, when the MMN 126 receives a path switch request 218 from the ingressing MBS 108, the MMN 126, in response, sends a traffic switch request 220 to the GWN 152. The traffic switch request 220 can include a request to switch the path of data associated with the UEs 104 to the ingressing MBS 108. Referring to FIG. 3, the handover module 304 can receive the path switch request from an ingressing MBS, and in response, send a traffic switch request to the gateway node to switch the traffic path for the handed over UEs to the ingressing MBS.

Figure 5:
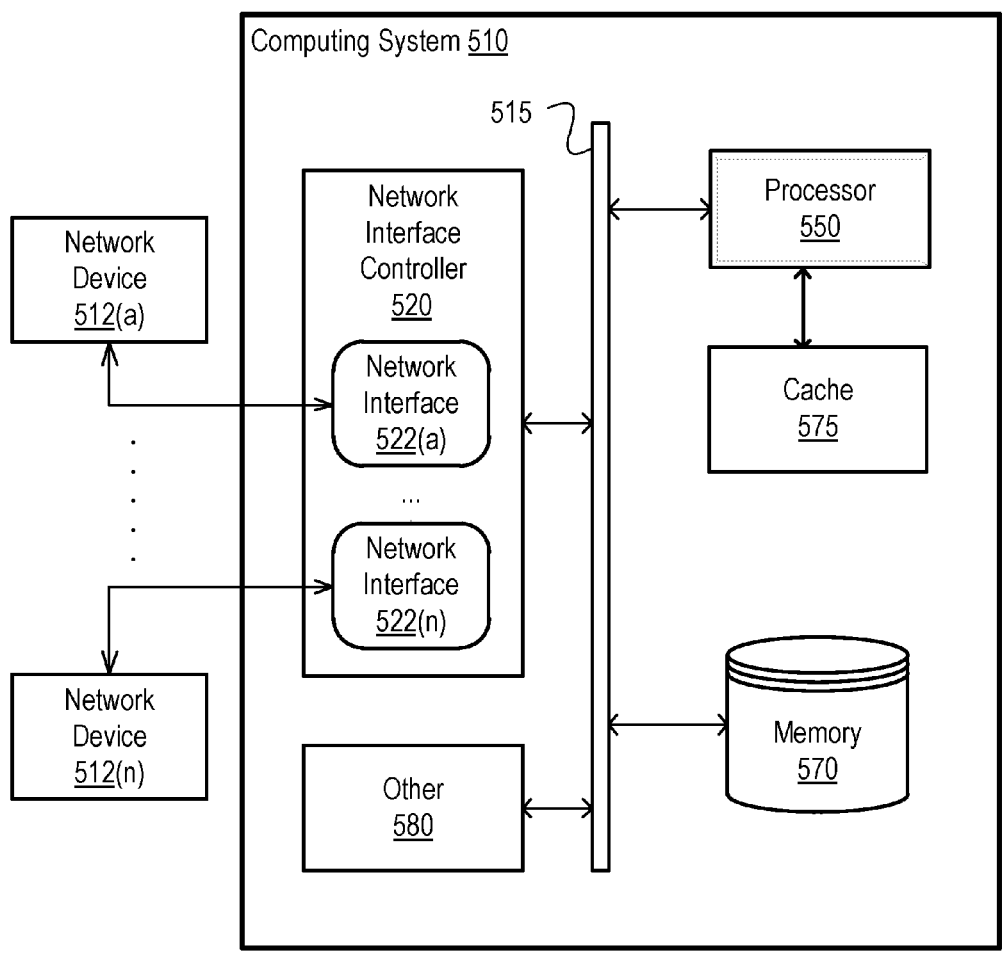
FIG. 5 shows a block diagram of an example computing system.

FIG. 5 shows a block diagram of an example computing system 510. In some implementations, the computing system 510 may be utilized in implementing the various components shown in FIGS. 1A-4. In some implementations, the computing system 510 can be utilized for implementing one or more modules of the mobility management node (MMN) shown in FIG. 1B and FIG. 3. In some implementations, the computing system 510 can be utilized to implement the GSN 130, the FCN 128, or the GWN 152 shown in FIG. 1B. In some implementations, one or more computing systems 510 can be utilized to execute one or more stages of the process 400 shown in FIG. 4.

In broad overview, the computing system 510 includes at least one processor 550 for performing actions in accordance with instructions and one or more memory devices 570 or 575 for storing instructions and data. The illustrated example computing system 510 includes one or more processors 550 in communication, via a bus 515, with at least one network interface controller 520 with network interface ports 522(a-n) connecting to other network devices 512(a-n), memory 570, and any other devices 580, e.g., an I/O interface. Generally, a processor 550 will execute instructions received from memory. The processor 550 illustrated incorporates, or is directly connected to, cache memory 575.

In more detail, the processor 550 may be any logic circuitry that processes instructions, e.g., instructions fetched from the memory 570 or cache 575. In many embodiments, the processor 550 is a microprocessor unit or special purpose processor. The computing system 510 may be based on any processor, or set of processors, capable of operating as described herein. In some implementations, the processor 550 can be capable of executing the process 400 shown in FIG. 4. The processor 550 may be a single core or multi-core processor. The processor 550 may be multiple processors. In some implementations, the processor 550 can be configured to run multi-threaded operations.

The memory 570 may be any device suitable for storing computer readable data. The memory 570 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 510 may have any number of memory devices 570. In some implementations, the memory 570 can include instructions corresponding to the process 400 shown in FIG. 4.

The cache memory 575 is generally a form of computer memory placed in close proximity to the processor 550 for fast read times. In some implementations, the cache memory 575 is part of, or on the same chip as, the processor 550. In some implementations, there are multiple levels of cache 575, e.g., L2 and L3 cache layers.

The network interface controller 520 manages data exchanges via the network interfaces 522(a-n) (also referred to as network interface ports). The network interface controller 520 handles the physical and data link layers of the OSI model for network communication. In some implementations, some of the network interface controller's tasks are handled by the processor 550. In some implementations, the network interface controller 520 is part of the processor 550. In some implementations, a computing system 510 has multiple network interface controllers 520. The network interfaces 522(a-n) are connection points for physical network links. In some implementations, the network interface controller 520 supports wireless network connections and an interface port 522 is a wireless receiver/transmitter. Generally, a computing system 510 exchanges data with other network devices 512(a-n) via physical or wireless links to a network interfaces 522(a-n). In some implementations, the network interface controller 520 implements a network protocol such as Ethernet.

The other network devices 512(a-n) are connected to the computing system 510 via a network interface port 522. The other network devices 512(a-n) may be peer computing devices, network devices, or any other computing device with network functionality. For example, a first network device 512(a) may be a network device such as a hub, a bridge, a switch, or a router, connecting the computing system 510 to a data network such as the Internet.

The other devices 580 may include an I/O interface, external serial device ports, and any additional co-processors. For example, a computing system 510 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing system 510 includes an additional device 580 such as a co-processor, e.g., a math co-processor can assist the processor 550 with high precision or complex calculations.

In some implementation, the other devices 580 can include global positioning and geo-fencing modules, that can allow generating and processing of global positioning data associated with the computing system 510.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for handing over radio communication between a plurality of user equipment (UEs) on the ground, within a geographical service zone having an associated ingress zone and an egress zone, and an egressing mobile base station to an ingressing mobile base station, comprising:
   receiving, at a management node on the ground, a registration request from an ingressing mobile base station when the ingressing mobile base station enters the ingress zone;
   sending, from the management node, communication parameters associated with the geographical service zone to the ingressing mobile base station;
   receiving, at the management node, a handover request from an egressing mobile base station when the egressing mobile base station enters the egress zone, wherein the handover request includes a list of UEs selected from the plurality of UEs;
   sending, from the management node, a forwarding handover request to the ingressing mobile base station;
   receiving, at the management node, a handover reply message from the ingressing mobile base station, the handover reply message including information associated with each of the UEs in the list of UEs with which the ingressing mobile base station is capable of establishing communication; and
   sending, from the management node, the handover reply message to the egressing mobile base station.

2. The method of claim 1, further comprising:
   sending, from the management node, a message to a flight control node to alter a flight parameter of at least one of the egressing mobile base station and the ingressing mobile base station.

3. The method of claim 1, further comprising:
   sending, from the management node, a message to a flight control node to verify that the ingressing mobile base station is located within the ingress zone.

4. The method of claim 1, wherein receiving, at the management node, a handover request from an egressing mobile base station when the egressing mobile base station enters the egress zone includes receiving the list of UEs selected from the plurality of UEs based on at least one of a signal strength of the plurality of UEs at the egressing mobile base station, proximity of the plurality of UEs to the ingress zone, and proximity of the plurality of the UEs to the egressing mobile base station.

5. The method of claim 4, wherein the list of UEs is an ordered list.

6. The method of claim 1, wherein the management node includes an LTE mobility management entity.

7. The method of claim 1, further comprising defining the ingress zone to be located substantially outside the geographical service zone and the egress zone to be located substantially inside the geographical service zone.

8. A mobile communication system for serving a plurality of user equipment (UEs) on the ground within a geographical service zone having an associated ingress zone and an associated egress zone comprising:
   a management node configured to:
   receive a registration request from an ingressing mobile base station when the ingressing mobile base station enters the ingress zone;
   send communication parameters associated with the geographical service zone to the ingressing mobile base station;
   receive a handover request from an egressing mobile base station when the egressing mobile base station enters the egress zone, wherein the handover request includes a list of UEs selected from the plurality of UEs;
   send the handover request to the ingressing mobile base station;
   receive a handover reply message from the ingressing mobile base station, the handover reply message including information associated with each of UEs in the list of UEs with which the ingressing mobile base station is capable of establishing communication; and
   send the handover reply message to the egressing mobile base station.

9. The communication system of claim 8, wherein the management node is further configured to send a message to a flight control node to alter a flight parameter of at least one of the egressing mobile base station and the ingressing mobile base station.

10. The communication system of claim 8, wherein the management node is further configured to send a message to a flight control node to verify that the ingressing mobile base station is located within the ingress zone.

11. The communication system of claim 8, wherein the list of UEs selected from the plurality of UEs is based on at least one of a signal strength of the plurality of UEs at the egressing mobile base station, proximity of the plurality of UEs to the ingress zone, and proximity of the plurality of the UEs to the egressing mobile base station.

12. The communication system of claim 11, wherein the management node is further configured to receive an ordered list of UEs.

13. The communication system of claim 11, wherein the management node is further configured to generate an ordered list of UEs.

14. The communication system of claim 8, wherein the management node is further configured to define the ingress zone to be located substantially outside the geographical service zone and the egress zone to be located substantially inside the geographical service zone.

15. A non-transitory computer readable storage medium having instructions encoded thereon, which when executed by a processor cause the processor to perform a method for handing over radio communication between a plurality of user equipment (UEs) on the ground, within a geographical service zone having an associated ingress zone and an egress zone, and an egressing mobile base station to an ingressing mobile base station, comprising:

receiving, at a management node on the ground, a registration request from an ingressing mobile base station when the ingressing mobile base station enters the ingress zone;

sending, from the management node, communication parameters associated with the geographical service zone to the ingressing mobile base station;

receiving, at the management node, a handover request from an egressing mobile base station when the egressing mobile base station enters the egress zone, wherein the handover request includes a list of UEs selected from the plurality of UEs;

sending, from the management node, a forwarding handover request to the ingressing mobile base station;

receiving, at the management node, a handover reply message from the ingressing mobile base station, the handover reply message including information associated with each of the UEs in the list of UEs with which the ingressing mobile base station is capable of establishing communication; and sending, from the management node, the handover reply message to the egressing mobile base station.

16. The non-transitory computer readable storage medium of claim 15, the method further comprising:

sending, from the management node, a message to a flight control node to alter a flight parameter of at least one of the egressing mobile base station and the ingressing mobile base station.

17. The non-transitory computer readable storage medium of claim 15, the method further comprising:

sending, from the management node, a message to a flight control node to verify that the ingressing mobile base station is located within the ingress zone.

18. The non-transitory computer readable storage medium of claim 15, wherein the list of UEs is an ordered list.

19. The non-transitory computer readable storage medium of claim 15, wherein the management node includes an LTE mobility management entity.

20. The non-transitory computer readable storage medium of claim 15, the method further comprising defining the ingress zone to be located substantially outside the geographical service zone and the egress zone to be located substantially inside the geographical service zone .

* * * * *